March 27, 1928.
E. A. ILEMAN
1,664,035
HYGROMETER APPARATUS
Filed Feb. 10, 1925
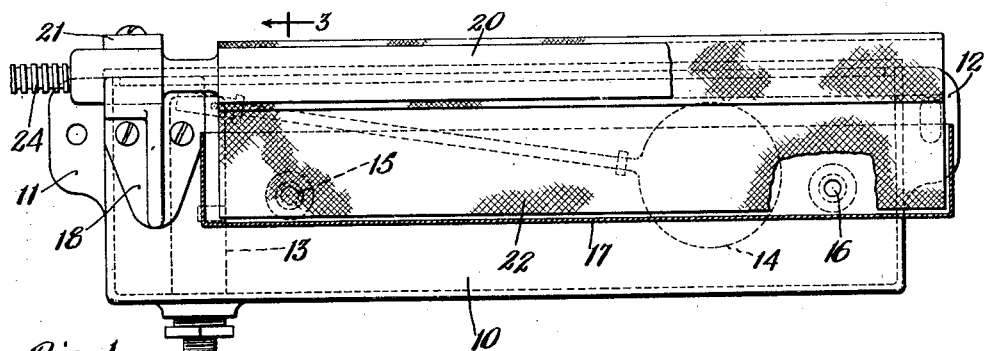
Fig: 1.
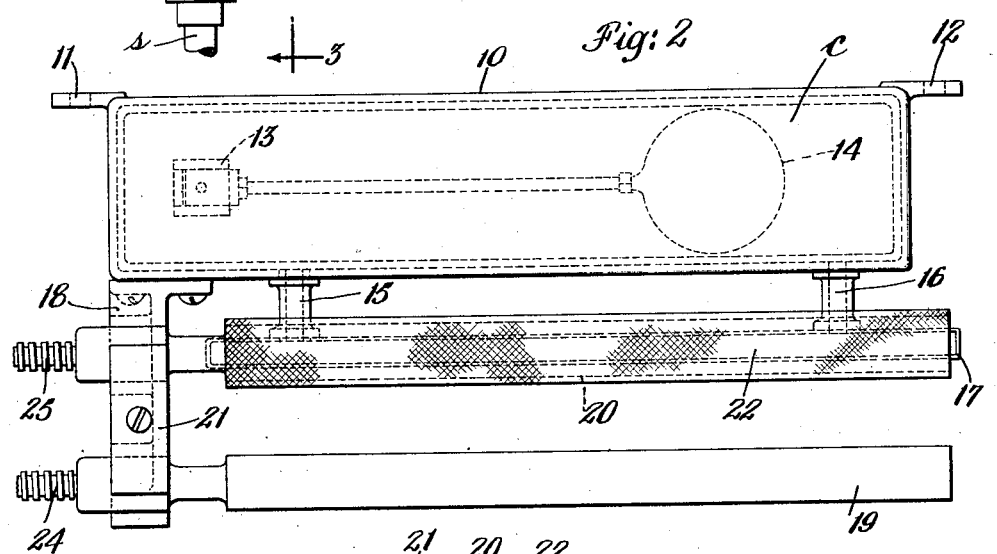
Fig: 2
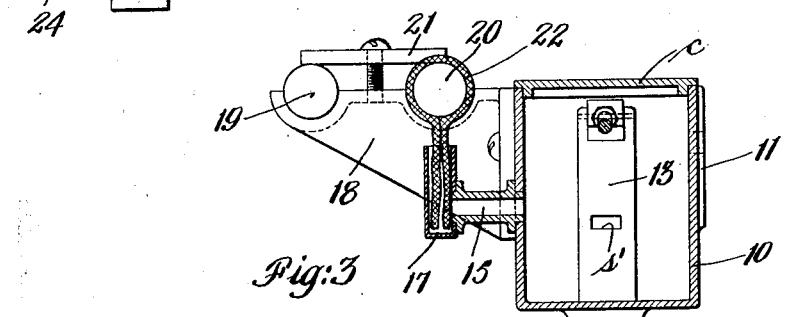
Fig: 3
INVENTOR
Emil A. Ileman
BY
Edwards, Sager & Bower
his ATTORNEYS Patented Mar. 27, 1928.

1,664,035

UNITED STATES PATENT OFFICE.

EMIL AUGUST ILEMAN, OF QUEENS, NEW YORK, ASSIGNOR TO AMERICAN SCHAEFFER AND BUDENBERG CORPORATION, A CORPORATION OF NEW YORK.

HYGROMETER APPARATUS.

Application filed February 10, 1925. Serial No. 8,161.

This invention relates to hygrometers and particularly to hygrometers utilizing a wet bulb in the measurement of the moisture content of the air.

The object of the invention is to provide simple, compact and efficient means for supplying liquid to the wet bulb at a temperature constantly the same as the temperature of the surrounding air.

Another object of the invention is to provide a combination of wet bulb and dry bulb apparatus which will position the wet and dry bulbs adjacent to each other on the same supporting means while preventing the moisture of the wet bulb from interfering with the action of the dry bulb.

Further objects of the invention particularly in the construction of the details of the apparatus will appear from the following description taken in connection with the accompanying drawings in which Fig. 1 is a vertical elevation of apparatus embodying the invention with parts shown broken away and in section.

Fig. 2 is a plan view of the apparatus shown in Fig. 1.

Fig. 3 is a vertical section view taken on the line 3—3 of Fig. 1.

The embodiment of the invention shown in the drawings comprises a tank or main water reservoir 10 to be fastened in place in any desired manner as by lugs 11 and 12. Within the reservoir a constant water level is maintained by a valve 13 which is connected to be opened and closed by the rise and fall of float 14 to admit water from the supply pipe $s$ through the supply opening $s'$. The reservoir 10 is of generally rectangular formation and is provided at the top with a closely fitting removable cover $c$.

At one side of the reservoir 10 are mounted two hollow supports 15 and 16 providing communication from below the constant level of reservoir 10 to an auxiliary tank or wick chamber 17, the wick chamber being supported from the main reservoir by said connections 15 and 16. This wick chamber 17 is of relatively thin material and narrow in width so as to just receive the depending portions of the wick 22. In this way the cubical contents of the wick chamber are reduced to a minimum and the quantity of water surrounding the wick is very small; at the same time the radiating surface of the wick chamber is extensive so that there is a very large ratio of radiating surface per cubic inch of water contained.

The supply of water is substantially constantly seeping in through the valve opening $s'$ into the main reservoir 10. This water supply is often of different temperature from the temperature of the space in which the hygrometer parts are located, and it is important to protect the wet bulb 20 from having its temperature affected by the temperature of the water supply. Therefore, the supply of water is first received in the relatively large body of liquid in the main reservoir 10 which has been brought near to the temperature of the space within which the apparatus is situated. From this body of water in the reservoir 10 a constant supply is slowly drawn off through connections 15 and 16 into the auxiliary wick chamber 17, from which it is drawn upward by wick 22 and evaporated from the exposed portions of the wick surrounding the wet bulb 20.

The connections 15 and 16 are so positioned as to draw from the reservoir water representing the higher temperature of the water in the reservoir and in the connections 15, 16 this supply is brought more nearly to the room temperature. Then in the small chamber 17 the relatively large radiating surface finally brings the temperature of the water so near to that of the room that there is no substantial difference. No matter what the rate of evaporation or what variation there is in the temperature of the water in the supply pipe $s$, water at substantially room temperature will be delivered to the wick 22.

The wet bulb 20 is freely spaced from the main reservoir and the supporting means so that there will be an easy uninterrupted flow of air around it; and the small width of the wick chamber 17 also offers very little resistance to the flow of air to the wick. The small narrow formation of the wick chamber 17 also reduces the area of water surface in which evaporation takes place, and which would affect the rate of evaporation of the water from the wick around the bulb. While there is constant supply of constant temperature water to the wick around the bulb there is thus also maintained a constant supply of room air to the outside of the wick giving a very accurate and precise relation between the temperature of the bulb 20 and the amount of moisture in the air passing to the wick.

The wet bulb 20 may be supported by a bracket 18 fastened in place at one end of reservoir 10 as shown; and this bracket may also carry the dry bulb 19 in parallel relation to the wet bulb and sufficiently spaced therefrom to be unaffected by the moisture from the wet bulb wick. Both of these bulbs may be fastened in place by a clamp 21.

In this way within compact apparatus the wet bulb is supplied with a continuous flow of air and moisture at the same temperature, while the dry bulb is conveniently carried in any desired relation to the wet bulb structure. From the dry bulb 19 and wet bulb 20 the flexible connections 24 and 25 lead to the indicating or recording instrument located at any desired point. The apparatus of this invention is mounted in any desired location in the space where the moisture is being measured, the wet and dry bulbs being supported from the reservoir tank so that it is only necessary to connect up the water supply pipe s.

I claim:

1. In a hygrometer apparatus, means forming an elongated horizontal chamber for receiving a wet bulb wick, the upper horizontal side of said chamber having an elongated horizontal opening and the width thereof being slightly greater than the thickness of the wick extending therethrough, means for supporting an elongated wet bulb so that it substantially overlies and is parallel to said opening whereby the wick may substantially completely cover the wet bulb, and means permitting liquid to be supplied to said chamber.

2. In a hygrometer apparatus, a main reservoir, an auxiliary chamber having an elongated horizontal opening, a wet bulb overlying said horizontal opening and having a wick extending downwardly through said opening into said chamber, and means for supporting said reservoir and chamber in operative relation whereby communication is had therebetween, and said chamber and opening leading therefrom being relatively narrow so as to fit said wick comparatively closely and of relatively small cubical contents in comparison to that of said reservoir.

3. In a hygrometer apparatus a main constant level reservoir, a wet bulb and a wick therefor having an upper portion surrounding the bulb and a lower portion receiving a supply of liquid and carrying it to said upper portion, means for supplying liquid to said reservoir to maintain its level therein, an auxiliary chamber for the lower portion of said wet bulb wick, said auxiliary chamber being relatively small and narrow so as to reduce its cubical contents in comparison with its surface area, and conduit connecting means between said auxiliary chamber and said main reservoir for feeding liquid to said wick so that the exposed surface of the liquid supply will be reduced and the liquid fed to the wick will be brought substantially to the temperature of the surrounding atmosphere irrespective of variations in the temperature of the supply to said reservoir.

4. In a hygrometer apparatus a main constant level reservoir, a wet bulb and a wick therefor having an upper portion surrounding the bulb and a lower portion receiving a supply of liquid and carrying it to said upper portion, means for supplying liquid to said reservoir to maintain its level therein, an auxiliary chamber for the lower portion of said wet bulb wick, said auxiliary chamber being relatively small and narrow so as to reduce its cubical contents in comparison with its surface area and permit free flow of air upward to the exposed portion of the wick, and conduit connecting means between said auxiliary chamber and said main reservoir spacing said chamber and reservoir apart and feeding liquid to said wick so that the exposed surface of the liquid supply will be reduced and the liquid fed to the wick will be brought substantially to the temperature of the surrounding atmosphere irrespective of variations in the temperature of the supply to said reservoir.

5. In a hygrometer apparatus a dry bulb and a wet bulb adjacent to said dry bulb and having a wick with its upper portion surrounding said wet bulb and its lower portion receiving a supply of liquid and carrying it to said upper portion, a main constant level reservoir and means for supplying liquid to said reservoir to maintain its level therein, an auxiliary chamber for the lower portion of said wet bulb wick, said auxiliary chamber being relatively small and narrow so as to reduce its cubical contents in comparison with its surface area and permit free flow of air upward to the exposed portion of the said wick without affecting said adjacent dry bulb, and conduit connecting means between said auxiliary chamber and said main reservoir spacing said chamber and reservoir apart and feeding liquid to said wick so that the exposed surface of the liquid supply will be reduced and the liquid fed to the wick will be brought substantially to the temperature of the surrounding atmosphere irrespective of variations in the temperature of the supply to said reservoir.

EMIL AUGUST ILEMAN.